(12) United States Patent
Puggelli et al.

(10) Patent No.: US 11,742,762 B2
(45) Date of Patent: *Aug. 29, 2023

(54) MULTIPHASE POWER CONVERTER WITH DIFFERENT VOLTAGE POSITIONING PER PHASE

(71) Applicant: Apple Inc., Cupertino, CA (US)

(72) Inventors: Alberto Alessandro Angelo Puggelli, Cupertino, CA (US); Hubert Attah, Santa Clara, CA (US); Hao Zhou, San Jose, CA (US); Shawn Searles, Austin, TX (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/934,648

(22) Filed: Sep. 23, 2022

(65) Prior Publication Data

US 2023/0086364 A1    Mar. 23, 2023

Related U.S. Application Data

(63) Continuation of application No. 16/791,773, filed on Feb. 14, 2020, now Pat. No. 11,456,670.

(51) Int. Cl.
*H02M 3/158* (2006.01)
*H02M 1/00* (2006.01)

(52) U.S. Cl.
CPC ....... *H02M 3/1584* (2013.01); *H02M 1/0025* (2021.05); *H02M 1/0032* (2021.05); *H02M 3/1586* (2021.05)

(58) Field of Classification Search
CPC . H02M 3/1584; H02M 3/1586; H02M 1/0025
See application file for complete search history.

(56) References Cited

U.S. PATENT DOCUMENTS

| | | | |
|---|---|---|---|
| 6,912,144 B1 | 6/2005 | Clavette | |
| 7,923,974 B2 | 4/2011 | Martin et al. | |
| 11,456,670 B2* | 9/2022 | Puggelli | H02M 3/1584 |
| 2006/0001408 A1 | 1/2006 | Southwell et al. | |
| 2007/0013350 A1 | 1/2007 | Tang et al. | |
| 2009/0121695 A1 | 5/2009 | Pierson et al. | |
| 2015/0002112 A1 | 1/2015 | Tang et al. | |
| 2017/0248996 A1 | 8/2017 | Zhang et al. | |
| 2018/0316255 A1 | 11/2018 | Tang | |
| 2019/0074770 A1 | 3/2019 | Trichy et al. | |
| 2019/0302818 A1 | 10/2019 | Liu et al. | |
| 2020/0044553 A1 | 2/2020 | Guo et al. | |
| 2020/0287459 A1 | 9/2020 | Schmitz et al. | |
| 2021/0357014 A1 | 11/2021 | Zhang et al. | |

* cited by examiner

*Primary Examiner* — Rafael O De Leon Domenech
(74) *Attorney, Agent, or Firm* — Kowert, Hood, Munyon, Rankin & Goetzel, P.C.; Scott W. Pape; Dean M. Munyon

(57) ABSTRACT

An apparatus includes a control circuit and a voltage regulator circuit coupled to a regulated power supply node. The voltage regulator circuit is configured to generate a power signal on the regulated power supply node using a reference voltage level. The apparatus further includes a control circuit that is configured to determine an operating mode using results of a comparison of a threshold value and a load current being drawn from the regulated power supply node by a load circuit. The control circuit may be further configured to set, in a first operating mode, the reference voltage level independently of the load current, and set, in a second operating mode, the reference voltage level using the load current.

20 Claims, 9 Drawing Sheets

MULTIPHASE POWER CONVERTER WITH DIFFERENT VOLTAGE POSITIONING PER PHASE

PRIORITY CLAIM

The present application is a continuation of U.S. application Ser. No. 16/791,773, entitled "MULTIPHASE POWER CONVERTER WITH DIFFERENT VOLTAGE POSITIONING PER PHASE," filed Feb. 14, 2020 (now U.S. Pat. No. 11,456,670), the disclosure of which is incorporated by reference herein in its entirety.

BACKGROUND

Technical Field

Embodiments described herein are related to the field of integrated circuits, and more particularly to power conversion circuits.

Description of the Related Art

A computer system may include one or more integrated circuits (ICs) such as a processor, volatile memory, non-volatile storage memory, communication interface, and the like. Power for some or all of these ICs is typically provided via a power conversion circuit such as a buck converter. Power conversion circuits receive an input power signal from a power source and may convert the input power signal to an output power signal in which one or more characteristics differ from the input power signal. For example, a battery is typically used as a power source in mobile computing devices. A power signal provided by the battery has a particular voltage level that may change over time as the battery discharges. A power conversion circuit may be used to modify the voltage level of the battery-supplied power signal to an output power signal with a voltage level that is suitable for use by one or more ICs included in the mobile computing devices.

Power consumption by the one or more ICs receiving the output power signal may change over time, depending on a state of the mobile computing device. For example, when the mobile computing device is in an idle state (e.g., a display screen is off, no foreground processes are active, and only a few background processes are active), then the power consumption may be low. When the mobile computing device becomes active (e.g., the display screen is on, one or more active foreground processes and several background processes are active), then the power consumption may be much greater than in the idle state. Accordingly, a wide range of power demands may be placed on the power conversion circuit.

SUMMARY OF THE EMBODIMENTS

Broadly speaking, apparatus, and methods are contemplated in which the apparatus includes a voltage regulator circuit coupled to a regulated power supply node and configured to generate a power signal on the regulated power supply node using a reference voltage level. The apparatus further includes a control circuit that is configured to determine an operating mode using results of a comparison of a threshold value and a load current being drawn from the regulated power supply node by a load circuit. The control circuit may be further configured to set, in a first operating mode, the reference voltage level independently of the load current, and set, in a second operating mode, the reference voltage level using the load current.

In a further example, the control circuit may be further configured to set the threshold value based on a determined value of a leakage current for the load circuit. In one example, the control circuit may be further configured to select the second operating mode in response to a determination that the load current is greater than the determined value of the leakage current.

In another example, the control circuit may be further configured to determine the value of the leakage current of the load circuit using one or more measurements of operating conditions of the load circuit. In an embodiment, the control circuit may be further configured, in the second operating mode, to reduce the reference voltage level in response to an increase in the load current.

In one example, to determine the value of the leakage current, the control circuit may be configured to access a stored base value of the leakage current for the load circuit. The control circuit may be further configured to determine a current value of the leakage current using the base value and the one or more measurements.

BRIEF DESCRIPTION OF THE DRAWINGS

The following detailed description makes reference to the accompanying drawings, which are now briefly described.

Figure 1:
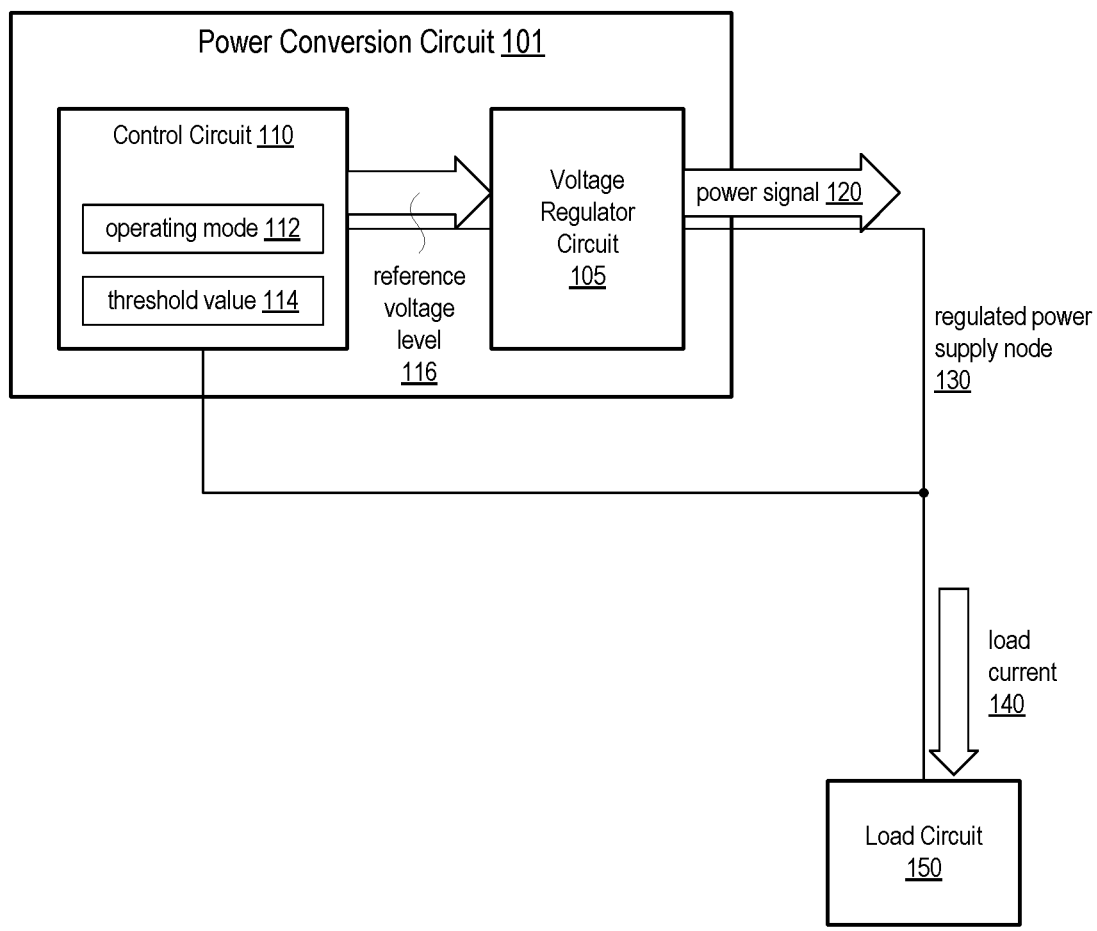
FIG. 1 illustrates a block diagram of an embodiment of a system that includes a power conversion circuit.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

A multi-phase power conversion circuit may be utilized to address at least some of the power demands for a power signal used by a load circuit in a computing device. A load circuit may be a portion of one integrated circuit (IC), may include a plurality of ICs, or any combination thereof. A multi-phase power conversion circuit includes two or more phase circuits, each phase circuit capable of generating a power signal with a particular amount of current to charge a regulated power node to a desired voltage level. In some multi-phase power conversion circuit designs, all phase circuits utilize similar design characteristics to contribute to a common power signal. When power demand from a load circuit is low, such as the load circuit is operating in an idle state, a single one of the phase circuits may be used to generate an adequate power signal while other phase circuits are disabled. As power demand increases, additional phase circuits are enabled to increase an amount power available for the load circuit. As used herein, "power signal" refers to current and voltage levels of a circuit node from which a load circuit draws power.

Designing a phase circuit that efficiently generates a power signal across a wide range of currents may be difficult and/or result in complex circuit designs. Accordingly, phase circuits are designed to maximize efficiency at a particular load current. Utilizing phase circuits with a common design may result in reduced efficiency when power demand from a load circuit is not within a particular operating range of the phase circuits. Efficiency of a power conversion circuit is an indication of how much power the power conversion circuit consumes when generating the desired power signal. The present inventors have recognized that particular power conversion circuit designs may present issues with respect to efficient operation across a wide range of load currents. In a battery-powered mobile device, for example, efficient operation during both idle states and active states may extend battery life. A power conversion circuit that operates at lower efficiency during either idle or active states will consume more power in one of these states, thereby increasing battery drain.

Embodiments of methods and apparatus are disclosed herein in which a power conversion circuit is designed to operate at peak efficiency under a variety of load currents. In one embodiment, for example, a power conversion circuit includes a voltage regulator circuit coupled to a regulated power supply node and configured to generate a power signal on the regulated power supply node using a reference voltage level. The power conversion circuit also includes a control circuit that is configured to determine an operating mode based on a load current being drawn from the regulated power supply node, and based on the operating mode, either set the reference voltage level independently of the load current, or set the reference voltage level using the load current. Use of such different reference voltages may increase an operating efficiency of the power conversion circuit, thereby reducing power consumption of a computing device, and in some mobile embodiments, increasing battery life.

A block diagram for an embodiment of a system that supplies power to a load circuit using a power conversion circuit is depicted in FIG. 1. As illustrated, system 100 includes power conversion circuit 101 and load circuit 150, and may correspond to any suitable type of computing device, such as a desktop or laptop computer, a tablet computer, a smart phone, a wearable device, a smart-home device, and the like. In some embodiments, power conversion circuit 101 is included in an integrated circuit (IC) along with load circuit 150. In other embodiments, the elements included in power conversion circuit may be co-located on a common IC, one or more ICs attached to a common circuit board, or one or more ICs located on different circuit boards. As illustrated, power conversion circuit 101 includes control circuit 110 and voltage regulator circuit 105. Control circuit 110 generates reference voltage level 116 that is used by voltage regulator circuit 105 to generate power signal 120 on regulated power supply node 130. Load circuit 150 receives power from regulated power supply node 130.

Power conversion circuit 101 uses control circuit 110 and voltage regulator circuit 105 to generate power signal 120 that provides power to regulated power supply node 130 at a variety of voltage levels. Power conversion circuit 101 receives power from, for example, an unregulated power source such as a rechargeable battery, and generates power signal 120 with appropriate voltage levels for proper operation of load circuit 150. A voltage level of regulated power supply node 130 may fluctuate in response to an amount of load current 140 that is being drawn by load circuit 150.

To generate power signal 120 for load circuit 150, power conversion circuit 101 includes voltage regulator circuit 105 coupled to regulated power supply node 130 and configured to generate power signal 120 on regulated power supply node 130 using reference voltage level 116. As illustrated, voltage regulator circuit 105 receives reference voltage level 116 from control circuit 110. Reference voltage level 116 indicates a target voltage level for power signal 120. In some embodiments, reference voltage level 116 is equal to the target voltage level, while in other embodiments, reference voltage level 116 is proportionate to the target voltage level. Voltage regulator circuit 105 may be implemented using any suitable regulation circuit design, such as a buck converter, boost converter, linear regulator, flyback converter, and the like.

It is noted that power signals, such as power signal 120, are described herein as being generated with a particular voltage level. Many power conversion circuits, such as buck regulators, generate a particular voltage level by alternately sourcing and sinking current to particular switch nodes using a combination of a timing signal and feedback in terms of a present voltage level on the particular switch nodes. Accordingly, a power signal that is described as having a particular voltage level may include some variation of the voltage level around the particular voltage level, commonly referred to as voltage ripple. The described particular voltage level of the power signal refers to a target voltage level. A given power signal may vary around this target voltage level with voltage ripple that is within an allowable range of the target voltage level. For example, a power signal may have a target voltage level of 1.0 volts, but is generated with a ripple such that the voltage level of the power signal oscillates between 1.03 volts and 0.97 volts.

Power conversion circuit 101 also includes control circuit 110 configured to determine operating mode 112 using results of a comparison of threshold value 114 and load current 140 being drawn from regulated power supply node 130 by load circuit 150. Control circuit 110, as shown, monitors an amount of load current 140 being drawn by load circuit 150. When a value of load current 140 is less than or equal to threshold value 114, control circuit 110 selects a first operating mode, and otherwise selects a second operating mode. Additional details regarding monitoring load current 140 and setting of threshold value 114 are described below in regards to FIG. 4.

As illustrated, control circuit 110 sets, in the first operating mode, reference voltage level 116 independently of load current 140, and sets, in the second operating mode, reference voltage level 116 using load current 140. In the first operating mode, when load current 140 is below threshold value 114, control circuit 110 sets reference voltage level 116 to a constant voltage level. It is noted that signals in an electronic circuit may fluctuate due to various influences in the circuit. For example, electro-magnetic noise generated by other nearby circuits may be coupled onto the signal, and changes in current demand from circuits receiving the signals may cause voltage droop on the signal. As used herein, a "constant voltage level" refers to a voltage level of a signal that is not intentionally modified by a circuit that generates the signal.

In the second operating mode, when load current 140 is above threshold value 114, control circuit 110 sets reference voltage level 116 based on a measurement of load current 140. For example, the control circuit may be further configured to reduce reference voltage level 116 in response to an increase in load current 140. In some embodiments, reference voltage level 116 is generated such that a value of reference voltage level 116 is inversely proportionate to a value of load current 140. In other embodiments, reference voltage level 116 is generated with respective values for a number of steps, each step corresponding to a particular range of values for load current 140. In at least one embodiment, reference voltage level 116 does not vary in response to changes in load current 140, but instead is set to a voltage level that is lower than in the first operating mode.

By switching an operating mode based on the load current, a power conversion circuit may be designed to increase efficiency when a load circuit draws a low load current, while maintaining a power signal with a sufficient voltage level to compensate for a sudden increase in the load current. By reducing the reference voltage level as the load current increases, power may be reduced at high load currents as compared to maintaining a constant reference voltage across various load current values.

It is noted that system 100 as illustrated in FIG. 1 is merely an example. The illustration of FIG. 1 has been simplified to highlight features relevant to this disclosure. Various embodiments may include different configurations of the circuit blocks, including additional circuit blocks. For example, voltage regulator circuit 105 may, in other embodiments, be implemented as a plurality of phase circuits. Although two operating modes are described, additional operating modes based on additional threshold values may be implemented.

Figure 2:
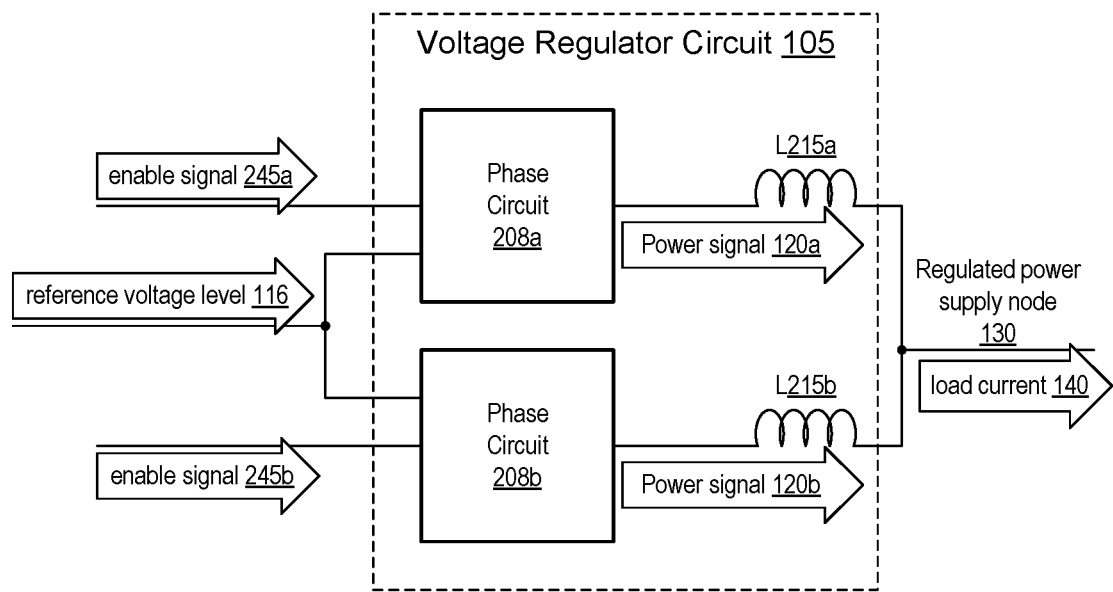
FIG. 2 shows a block diagram of an embodiment of a voltage regulator circuit included in a power conversion circuit.

The system illustrated in FIG. 1 is described as using a voltage regulator circuit to generate a power signal. Voltage regulator circuits may be implemented according to various design techniques. A particular example of a voltage regulator circuit that may be implemented in system 100 is shown in FIG. 2. The particular voltage regulator circuit of FIG. 2 includes two phase circuits for generating a power signal on the regulated power supply node.

Moving to FIG. 2, a block diagram of an embodiment of a voltage regulator circuit is illustrated. Voltage regulator circuit 105, as shown, includes phase circuits 208a and 208b coupled to regulated power supply node 130 via respective ones of inductive elements L215a and L215b. Both phase circuits 208a and 208b receive reference voltage level 116. In addition, phase circuit 208a receives enable signal 245a and phase circuit 208b receives enable signal 245b.

As illustrated, voltage regulator circuit 105 utilizes phase circuit 208a to generate power signal 120a. Phase circuit 208a is coupled to regulated power supply node 130, via inductive element L215a. Phase circuit 208a is configured, in response to being enabled, to generate power signal 120a on regulated power supply node 130 using a reference voltage level 116 that is generated independent of load current 140 being drawn from the regulated power supply node by load circuit 150 (shown in FIG. 1). When enable signal 245a is asserted, by control circuit 110 for example, phase circuit 208a generates power signal 120a with a voltage level that is based on reference voltage level 116. While enable signal 245a is asserted, reference voltage level 116 is generated with a target voltage level that does not change in response to changes in load current 140. In some embodiments, reference voltage level 116 may be adjusted, e.g. by control circuit 110, in response to a change in operating mode 112 or in response to changes in other parameters such as an operating temperature of system 100. Reference voltage level 116, however, does not change in response to variations in load current 140 when enable signal 245a is asserted.

Voltage regulator circuit 105 utilizes phase circuit 208b to generate power signal 120b. Phase circuit 208b is coupled to regulated power supply node 130, via inductive element L215b. Phase circuit 208b is configured, in response to an assertion of enable signal 245b, to generate power signal 120b on regulated power supply node 130 using reference voltage level 116 that, when enable signal 245b is asserted, is based on load current 140. In contrast to phase circuit 208a, phase circuit 208b is configured to generate power signal 120b with a voltage level that varies in response to changes in load current 140. For example, to compensate for power consumption increases as load current 140 increases, reference voltage level 116 may be reduced, causing phase circuit 208b to reduce the voltage level of power signal 120. For a given amount of load current 140, a reduced voltage level on regulated power supply node 130 lessens the power consumption.

As will be discussed in more detail below, control circuit 110 controls the assertion of enable signals 245a and 245b, as well as a source for reference voltage level 116. Based on the determined operating mode 112, control circuit 110 asserts either enable signal 245a or enable signal 245b. For example, control circuit may be configured to enable phase circuit 208a in response to a determination that load current 140 is less than or equal to threshold value 114, and to otherwise enable phase circuit 208b in response to a determination that load current 140 is greater than threshold value 114. Regulated power supply node 130, therefore, receives power from power signal 120a in a first operating mode and from power signal 120b in a second operating mode. Inductive elements L215a and L215b may help to maintain load current 140 during a switch between the two operating modes. Generally, enable signals 245a and 245b are not enabled at a same point in time. In some embodiments, however, there may be a slight overlap in the assertion of enable signals 245a and 245b in response to change in operating mode 112. Such overlap, which may, for example, be several microseconds, or tens or hundreds of nanoseconds, helps to maintain power to load circuit 150.

The use of the two different phase circuits for generating a power signal on regulated power supply node 130 allows for each phase circuit to be designed for an increased operating efficiency at particular load currents. Since phase circuit 208a is enabled when load current 140 is less than threshold value 114, phase circuit 208a may be designed to generate power signal 120a more efficiently when load current 140 is at or below threshold value 114. In a similar manner, phase circuit 208b may be optimized for generating power signal 120b with a current that is greater than threshold value 114. For example, if threshold value 114 corresponds to a value of load current 140 that is at or near a leakage current of load circuit 150, then phase circuit 208a may be optimized for supplying power signal 120a to satisfy the leakage current demand while load circuit 150 is in a reduced power mode and/or idle state. Phase circuit 208b may then be optimized for supplying power signal 120b to satisfy a higher current demand for load circuit 150 when load circuit 150 is in an active state. As used herein, "efficient operation" and "optimized designs" relate to an amount of power consumed by a voltage regulation circuit while generating a power signal. Increased efficiency corresponds to less power consumed by the voltage regulator circuit when generating a particular power signal, as compared to less efficient voltage regulator circuits.

It is noted that voltage regulator circuit 105 is an example for demonstrating the disclosed concepts. FIG. 2 has been simplified to show only elements related to the description of the disclosed concepts. Other embodiments may include additional elements, such as additional phase circuits. For example, one embodiment of the voltage regulator circuit may implement one phase circuit 208a to provide power when a load circuit is in an idle state, and two or three phase circuits 208b to provide an adjustable power signal when the load circuit is at various levels of activity.

Phase circuits are introduced in the description of the voltage regulator circuit illustrated in FIG. 2. for generating a power signal. Phase circuits may be implemented using any suitable one of multiple circuit designs. An example of a phase circuit that may be implemented as phase circuit 208a or 208b is shown in FIG. 3.

Figure 3:
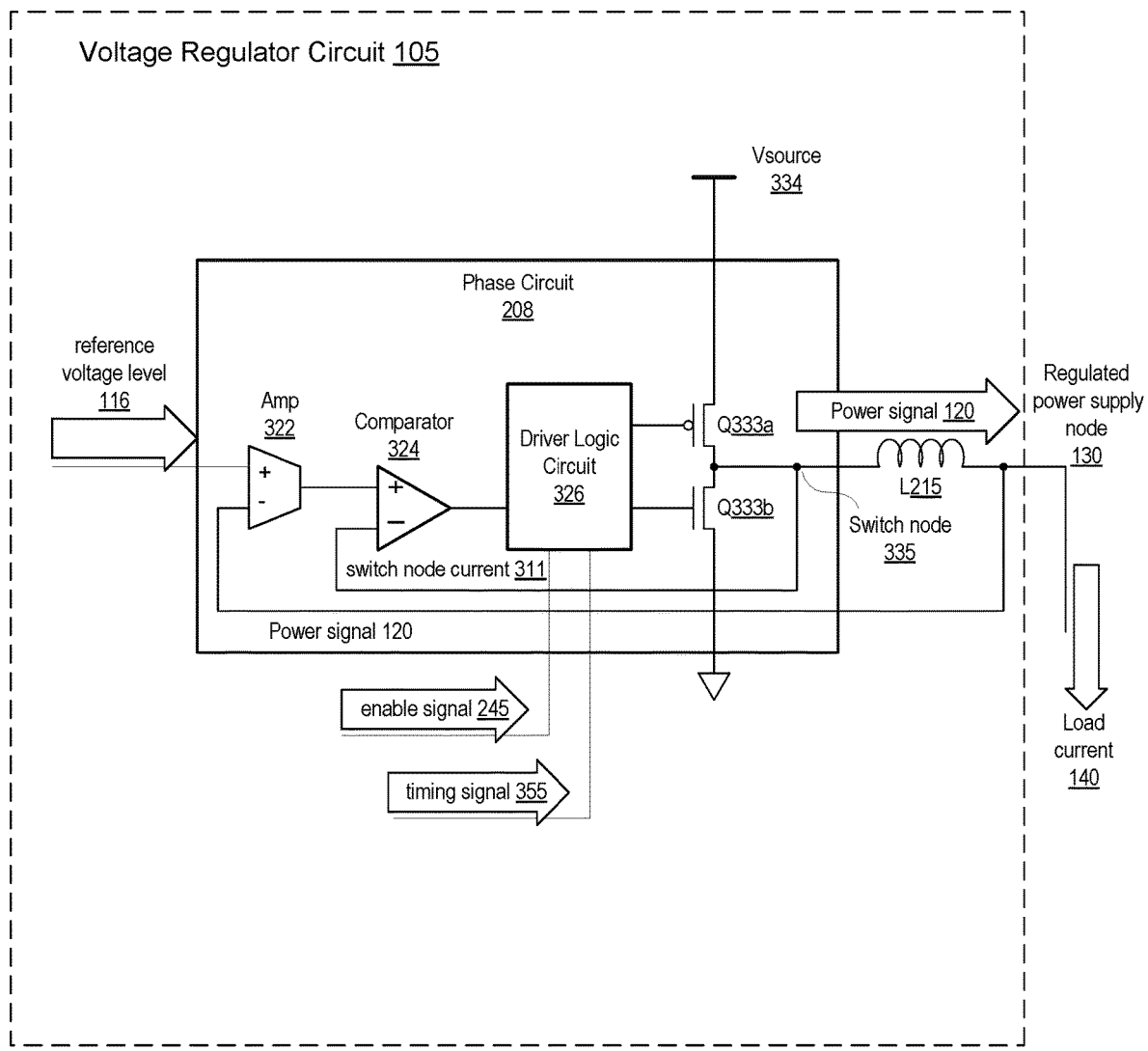
FIG. 3 depicts a block diagram of an embodiment of a phase circuit included in a voltage regulator circuit.

Turning to FIG. 3, a phase circuit included in a voltage regulator circuit is depicted. Voltage regulator circuit 105 includes phase circuit 208 coupled to inductive element L215, both of which may correspond to either phase circuit 208a and L215a or phase circuit 208b and L215b in FIG. 2. Phase circuit 208 includes transconductance amplifier (amp) 322 coupled to comparator 324 which is further coupled to driver logic circuit 326. Driver logic circuit 326 is coupled to the control terminals of transconductance devices Q333a and Q333b. Phase circuit 208 receives reference voltage level 116, enable signal 245, and timing signal 355, and generates power signal 120 (corresponding to power signal 120a or 120b in FIG. 2) on switch node 335 that is then conducted to regulated power supply node 130 via inductive element L215.

Phase circuit 208 generates power signal 120 with a voltage level that is based on reference voltage level 116. Phase circuit 208 utilizes feedback from regulated power supply node 130 and switch node 335 to regulate power delivery from Vsource 334 to switch node 335. Vsource 334 is a power signal from a power supply, such as a battery, a transformer circuit, or a different voltage regulator circuit. It is noted that, due to indicative element L215, the voltage level of regulated power supply node 130 may be different at any given point in time from the voltage level of switch node 335.

As illustrated, amp 322 receives reference voltage level 116 and power signal 120 from regulated power supply node 130 at respective positive and negative input terminals. Amp 322 generates an output signal with an amount of current that is based on a difference between the positive and negative terminals. Comparator 324 receives the current output from amp 322 at a positive terminal and receives signal switch node current 311 at a negative terminal. Switch node current 311 corresponds to a sensed amount of current flowing through switch node 335. While the output current of amp 322 is higher than the switch node current 311, the output of comparator 324 is asserted.

Driver logic circuit 326 receives the output of comparator 324, as well as enable signal 245 and timing signal 355. When enable signal 245 is de-asserted, driver logic circuit 326 de-asserts the control terminals of both transconductive devices Q333a and Q333b, such that neither device is enabled. Voltage regulator circuit 105 may be in an off or idle state at this time, or a different phase circuit within voltage regulator circuit 105 may be enabled while enable signal 245 is de-asserted.

When enable signal 245 is asserted, driver logic circuit 326 asserts the control terminals of Q333a and Q333b depending on states of the received output of comparator 324 and timing signal 355. Timing signal 355 includes a series of pulses that are used to define time periods for alternately enabling either Q333a or Q333b. Enabling Q333a couples Vsource 334 to switch node 335, thereby sourcing charge to switch node 335 which may increase switch node current 311 which in turn is conducted to load circuit 150 as load current 140. In contrast, enabling Q333b couples switch node 335 to a ground reference, thereby discharging switch node 335 and reducing switch node current 311. The output of comparator 324 is based on a difference between reference voltage level 116 and the level of power signal 120, as well as the amount of switch node current 311. This output signal is used by driver logic circuit 326 to modify an amount of time that either Q333a or Q333b is enabled, thereby increasing or decreasing, respectively, a voltage level of power signal 120.

Q333a and Q333b, as illustrated, are implemented as metal-oxide-semiconductor field-effect transistors (MOSFETs) for generating power signal 120. To optimize phase circuit 208 for supplying smaller load currents, such as described above for phase circuit 208a, Q333a and Q333b may have smaller effective channel lengths corresponding MOSFETs included in a different phase circuit, such as phase circuit 208b. In regards to MOSFETs, channel length refers to a length of an active region under the control gate, between the source and drain. Other characteristics of Q333a and Q333b may be different between phase circuits 208a and 208b to optimize phase circuit 208a for supplying lower load currents than phase circuit 208b. For example, in place of or in addition to different channel lengths, MOSFETs for phase circuit 208a may be implemented using a high voltage threshold device (HVT), while corresponding MOSFETs for phase circuit 208b are implemented using a standard or low voltage threshold device (SVT or LVT).

It is noted that FIG. 3 is merely one example of a voltage regulation technique that may be used to implement one or more phase circuits in a power conversion circuit. In other embodiments, additional or different components may be utilized. For example, in some embodiments, capacitors may be included between the switch node and the ground reference and/or between the regulated power supply node and the ground reference. In other embodiments, a different regulation scheme may be implemented, such as switching regulator circuit.

In FIG. 1, a control circuit is described as determining an operating mode and providing a reference voltage level to a voltage regulator circuit. A particular example of a control circuit that may be implemented as control circuit 110 is shown in FIG. 4.

Figure 4:
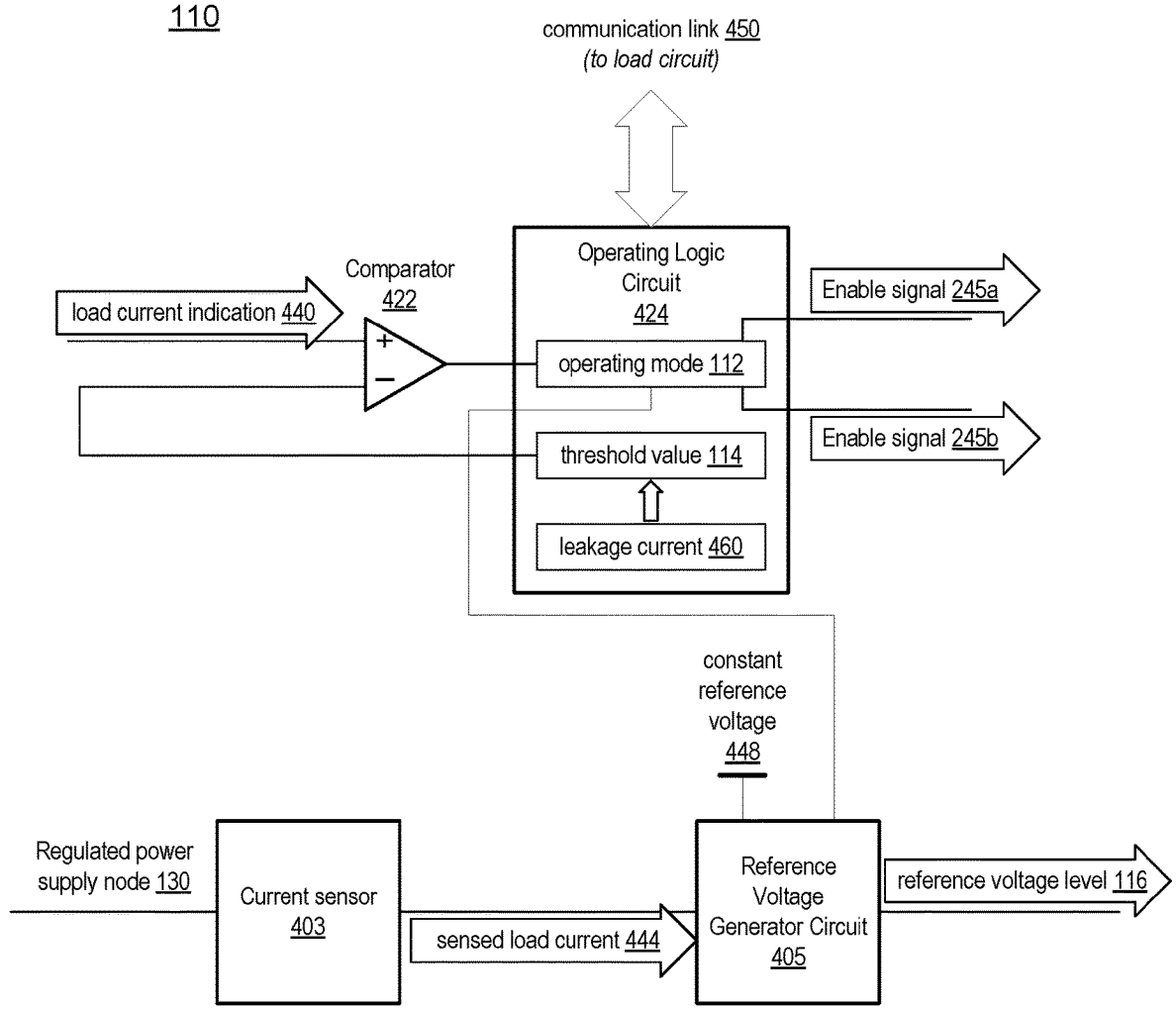
FIG. 4 illustrates a block diagram of an embodiment of a control circuit included in a power conversion circuit.

Proceeding to FIG. 4, an embodiment of a control circuit for use in a power conversion circuit is illustrated. As illustrated, control circuit 110 includes operating logic circuit 424, reference voltage generator circuit 405, current sensor 403, and comparator 422. Current sensor 403 is coupled to regulated power supply node 130. Reference voltage generator circuit 405 generates reference voltage level 116 as an output. Comparator 422 receives load current indication 440 (an indication of an amount of load current 140) as an input. Operating logic circuit 424 generates enable signals 245a and 245b as outputs and includes a communication link 450 that is coupled to load circuit 150 in FIG. 1.

As shown, comparator 422 is a comparator circuit that receives load current indication 440 and compares this value to threshold value 114 to generate an output based on the comparison. Load current indication 440 is a digital value indicative of a present amount of load current 140 flowing to load circuit 150 and, in some embodiments, is derived from a measurement of sensed load current 444. The output of comparator 422 is used by operating logic circuit 424 to determine operating mode 112. In other embodiments, comparator 422 may be an analog comparator circuit, receiving an analog value for load current indication 440 (e.g., sensed load current 444) and threshold value 114 may be generated as a comparable analog signal (e.g., an output of a digital-to-analog converter).

In various embodiments, operating logic circuit 424 sets or receives a value for threshold value 114. Threshold value 114 may be selected as any suitable value for causing a change to operating mode 112. As illustrated, operating logic circuit 424 is configured to set threshold value 114 based on leakage current 460. Leakage current 460 is an indication of a present value of leakage current consumed by load circuit 150. In response to a determination that load current indication 440 is greater than leakage current 460, operating logic circuit 424 is further configured to select a particular operating mode in which reference voltage level 116 is set using load current 140, and to otherwise select a different operating mode in which reference voltage level 116 is set independently of load current 140.

Operating logic circuit 424 determines a value for leakage current 460 using any suitable technique. In some embodiments, operating logic circuit 424 may be configured to determine the value of leakage current 460 using one or more measurements of operating conditions of load circuit 150. For example, operating logic circuit 424 may use communication link 450 to receive a temperature value from a temperature sensor located in load circuit 150 or receive age information that is indicative of a wear level of load circuit 150. In some embodiments, operating logic circuit 424 uses fabrication process information received from load circuit 150. Fabrication process information includes values associated with a chip manufacturing process used to create one or more ICs included in load circuit 150, or used to create an IC that includes both power conversion circuit 101 and load circuit 150. Such process information may include typical voltage thresholds of transistors and/or effective transistor channel sizes. Operating logic circuit 424 may then access a stored base value of leakage current 460 (accessed from load circuit 150 or from a memory location accessible by operating logic circuit 424), and determine a current value of leakage current 460 using the base value and the one or more measurements.

Operating logic circuit 424 sets threshold value 114 using the determined leakage current, which in turn, determines a particular amount of load current 140 that will trigger a change in operating mode 112. When load current indication 440 indicates that load current 140 is at or below leakage current 460, operating mode 112 is set to a first value, indicating a first operating mode in which reference voltage level 116 is set independently of load current 140. In a similar manner, when load current 140 is above leakage current 460, operating mode 112 is set to a second value, indicating a second operating mode in which reference voltage level 116 is set based on load current 140.

Reference voltage generator circuit 405 illustrates an example of how reference voltage level 116 is generated based on a current value of operating mode 112. As shown, reference voltage generator circuit 405 receives constant reference voltage 448. Constant reference voltage 448 may be an output of a different power conversion circuit, based on a bandgap voltage reference, an output of a digital-to-analog converter circuit, or any other suitable circuit for generating a DC power signal. In some embodiments, reference voltage generator circuit 405 may be capable of modifying the voltage level of constant reference voltage independently of load current 140. When operating mode 112 is set to the first value, reference voltage generator circuit 405 is configured to select constant reference voltage 448 as a source for reference voltage level 116.

When operating mode 112 is set to the second value, reference voltage generator circuit 405 is configured to select a variable reference voltage as a source for reference voltage level 116. To generate this variable reference voltage, reference voltage generator circuit 405 utilizes both constant reference voltage 448 and sensed load current 444. Current sensor 403 generates sensed load current 444 by sensing an amount of load current 140 flowing from regulated power supply node 130. To sense load current 140, current sensor may include a resistive device coupled between regulated power supply node 130 and load circuit 150, as well as one or more current mirror circuits to generate a suitable signal to be used as sensed load current 444. Reference voltage generator circuit 405 may, in some embodiments, use sensed load current 444 to generate a signal with a voltage drop from constant reference voltage 448. The variable reference voltage, in such an embodiment, has a voltage level equal to the voltage level of constant reference voltage 448 minus the voltage drop. Accordingly, a voltage level of the variable reference voltage will decrease as sensed load current 444 increases.

It is noted that depending on leakage current 460, at the point at which operating mode 112 switches from the first value to the second value, the level of constant reference voltage 448 is greater than the level of the variable reference voltage when load current indication 440 is equal to threshold value 114. Reference voltage generator circuit 405 may be configured to control an amount of this voltage level difference at this operating mode switching point.

It is further noted that the control circuit of FIG. 4 is merely an example. Various details have been omitted from FIG. 4 to increase clarity. For example, the current mirror circuit for generating the variable reference voltage may, in some embodiments, include additional components. In other embodiments, a different circuit may be used to generate a variable reference voltage.

Figure 5:
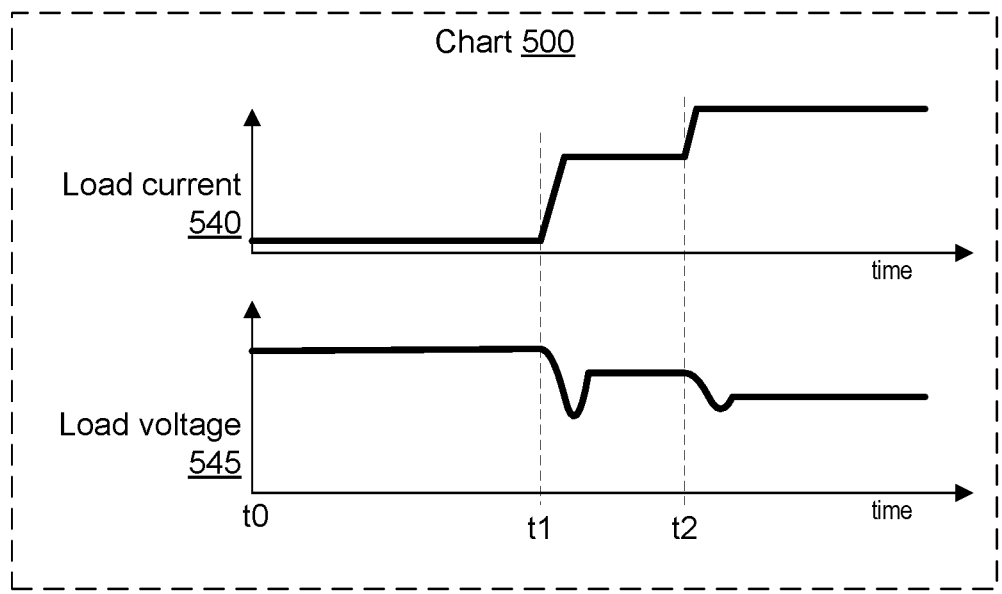
FIG. 5 depicts a chart of waveforms associated with an embodiment of a power conversion circuit.
Figure 5:
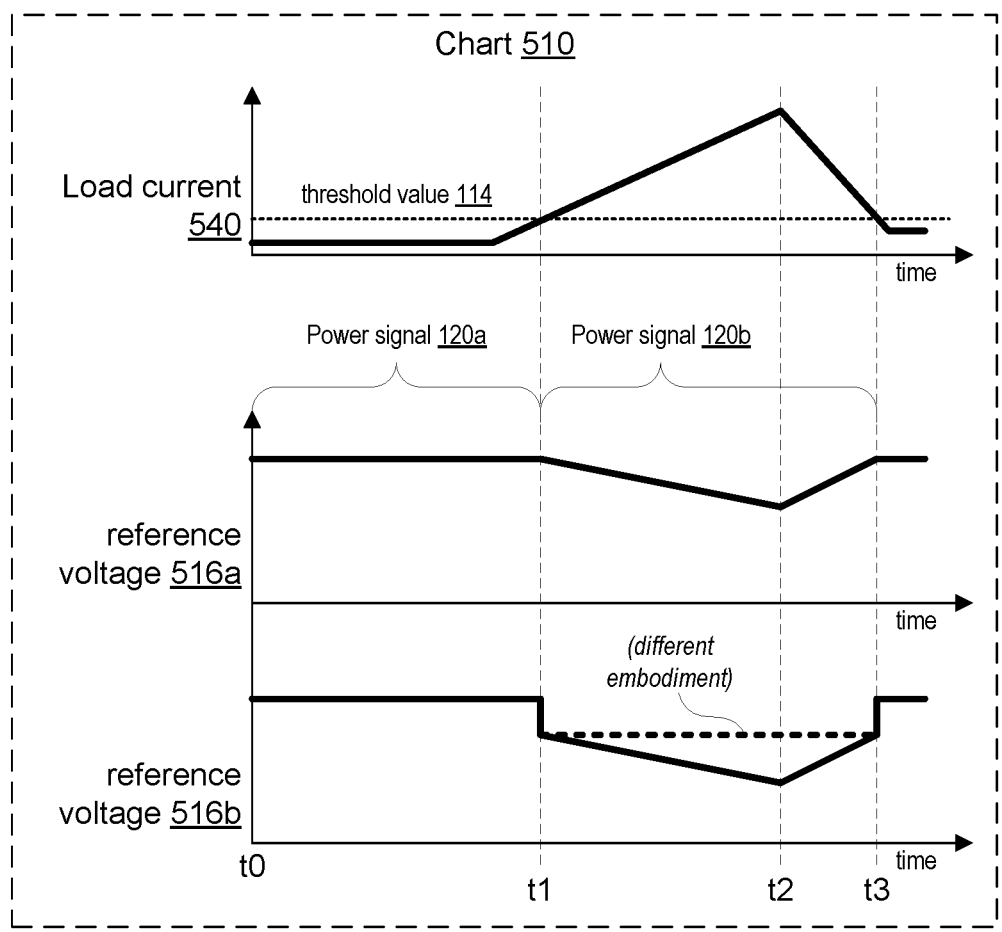

FIGS. 1-4 have disclosed various embodiments of circuits for generating a voltage level on a regulated power supply node. In FIG. 5, two charts are shown that depict possible waveforms for disclosed signals associated with these circuits.

Moving now to FIG. 5, two charts are illustrated that depict example waveforms associated with power conversion circuits. Chart 500 includes two waveforms: load current 540 and load voltage 545. Load current 540 depicts an amount of load current 140 drawn by load circuit 150 (FIG. 1) over time. Load voltage 545 illustrates an example of voltage levels of regulated power supply node 130 over time, in response to the amount of load current 140. Chart 510 includes three waveforms: load current 540 (at different times than shown in chart 500), reference voltage 516a and reference voltage 516b. Reference voltages 516a and 516b depict example waveforms for reference voltage level 116 for two different embodiments of a power conversion circuit 101.

Chart 500 illustrates examples of voltage droop that may occur on regulated power supply node 130 in response to a sudden increase in current consumption from load circuit 150. At time t0, load circuit 150 may be in an idle state, resulting in load current 540 being at or near a determined leakage current for load circuit 150. Power conversion circuit 101 generates power signal 120 with a first target voltage level, resulting in load voltage 545 being higher than at subsequent points in time. At time t1, load circuit 150 exits the idle state, thereby causing a sudden increase in load current 540. This sudden increase causes a sudden drop in load voltage 545 as power conversion circuit 101 changes mode to catch up to the sudden increase in load current 540. The voltage level of load voltage 545 eventually rises back to a second target voltage level that is lower than the first target voltage level. The drop in load voltage below the second target voltage level is referred to as "voltage droop." If this voltage droop falls to a level that is below a safe operating level for load circuit 150, then load circuit 150 may fail to operate properly, potentially resulting in temporary glitches in operation or a complete system crash. Power conversion circuit 101 may, therefore, be designed to compensate for voltage droop by generating load voltage 545 at a suitably high voltage level to prevent a voltage droop from reaching an unsafe operating level.

At time t2, another example of voltage droop is depicted. At this point, however, the difference between load current 540 before and after time t2 is not as large of an increase since load circuit 150 was already consuming an operational amount of current. Accordingly, the voltage droop is not as severe as at time t1. Since voltage droop in response to an increase in load current, as illustrated, is less severe as the pre-droop load current 540 increases, the target voltage levels may be reduced as load current increases. As disclosed above, reducing the target voltage level of regulated power supply node 130 as load current 540 increases may reduce power consumption of load circuit 150 as compared to maintaining a same target voltage level for all amounts of load current 540. Raising the target voltage level at lower amounts of load current 540, however, may help to compensate against voltage droop which may increase in severity as load current 540 approaches the leakage current of load circuit 150.

Chart 510 shows examples of how, in power conversion circuit 101, reference voltage level 116 may be adjusted in response to various amounts of load current 540. At time t0, load circuit 150 may again be in an idle state, consuming an amount of load current 540 that is at or near a leakage current determined for load circuit 150. Between times t0 and t1, control circuit 110 determines that load current 540 is below threshold value 114, and, referring to FIG. 2, selects a first operating mode in which phase circuit 208a generates power signal 120a to supply regulated power supply node 130. At time t1, load current 540 surpasses threshold value 114, causing control circuit 110 to switch to a second operating mode. In the second operating mode, phase circuit 208a is disabled and phase circuit 208b is enabled, generating power signal 120b to supply regulated power supply node 130. For both reference voltage 516a and 516b, the voltage levels are inversely proportionate to load current 540, as load current 540 increases from time t1 to t2, reference voltages 516a and 516b decrease. As load current 540 decreases from time t2 to t3, reference voltages 516a and 516b increase, until, at time t3, load current 540 falls below threshold value 114. Control circuit 110 disables phase circuit 208b and enables phase circuit 208a, and reference voltages 516a and 516b are set independent of load current 540.

Reference voltage 516a is associated with a first embodiment of power conversion circuit 101. This first embodiment is configured to produce a reference voltage level that is the same at the point at which load current 540 equals threshold value 114. In some systems, load circuit 150 may be sensitive to changes in the voltage level of regulated power supply node 130. Accordingly, maintaining a same reference voltage 516a at the transition point between the first and second operating modes, may prevent glitches in operation of such load circuits.

Reference voltage 516b is associated with a second embodiment of power conversion circuit 101. This second embodiment is configured to generate a reference voltage level in which a first reference voltage level in the first operating mode is greater than the second reference voltage level in the second operating mode when load current 540 is equal to threshold value 114. By reducing the voltage level of reference voltage 516b at the transition point (e.g., times t1 and t2), additional power savings may be achieved. In such an embodiment, the higher voltage level of reference voltage 516b in the first operating mode is sufficient to avoid voltage droop from reaching an unsafe level when load circuit 150 transitions to an active state. By the time phase circuit 208b is enabled and utilizing the lower reference voltage 516b in the second operating mode, the voltage droop may have recovered and regulated power supply node 130 is at the target voltage level.

Between times t1 and t3, a dashed line is illustrated that does not change in response to the changes in load current 540. This dashed line is associated with a different embodiment of a power conversion circuit. In some embodiments, load current 540 for a load circuit 150 may not vary significantly while in an active state, or load circuit 150 may require a more consistent voltage level on regulated power supply node 130, such that reducing the voltage level in response to increases in load current 540 is not suitable. In such embodiments, the level of reference voltage 516b may not be varied. Instead, a first reference voltage level is utilized in the first operating mode and a second reference voltage level is utilized in the second operating mode. Such an embodiment may reduce a number of elements used to implement a reference voltage generator circuit as compared to reference voltage generator circuit 405 in FIG. 4.

It is noted that the charts in FIG. 5 are used as examples, and have been simplified for clarity. In other embodiments, the illustrated waveforms may not appear as linear due to circuit limitations as well as noise coupled from signals propagating around the power conversion circuit.

The circuits described above in FIGS. 1-4 may generate regulated power signals using a variety of methods. One such method for generating a power signal based on a load current is described in FIG. 6.

Figure 6:
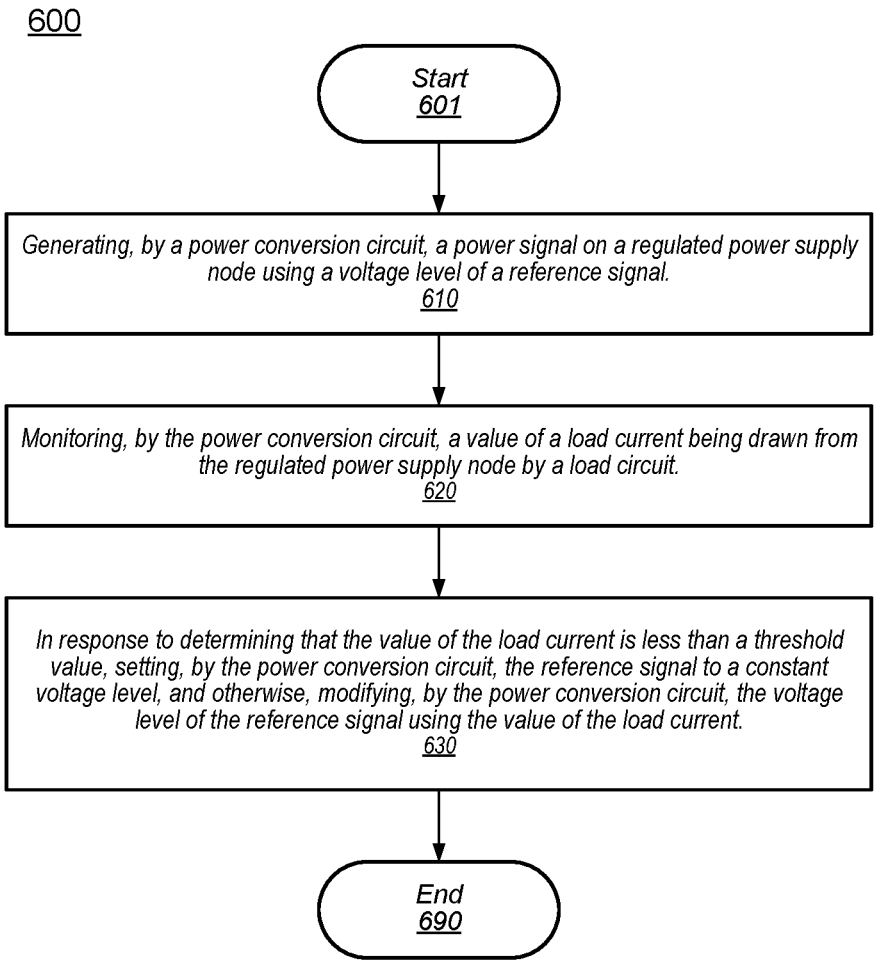
FIG. 6 illustrates a flow diagram of an embodiment of a method for operating a power conversion circuit.

Turning now to FIG. 6, a flow diagram for an embodiment of a method for generating a power signal by a power conversion circuit is shown. Method 600 may be performed by, for example, power conversion circuit 101 in FIG. 1. Referring collectively to FIGS. 1 and 6, method 600 begins in block 601.

At block 610, method 600 includes generating, by a power conversion circuit, a power signal on a regulated power supply node using a voltage level of a reference signal. As illustrated, voltage regulator circuit 105 of power conversion circuit 101 generates power signal 120 on regulated power supply node 130 in order to provide power to load circuit 150. Voltage regulator circuit 105 receives reference voltage level 116 from control circuit 110 and uses this voltage level to adjust a voltage level of power signal 120.

Method 600 further includes, at block 620, monitoring, by the power conversion circuit, a value of a load current being drawn from the regulated power supply node by a load circuit. Control circuit 110, as shown, receives a value indicative of load current 140. For example, control circuit 110 may include a current sensing circuit coupled between regulated power supply node 130 and load circuit 150. This current sensing circuit may, in various embodiments, provide a digital value or an analog signal that is indicative of a sensed amount of load current 140. These sensed values may be received by control circuit 110 periodically or continuously.

At block 630, method 600 further includes, in response to determining that the value of the load current is less than a threshold value, setting, by the power conversion circuit, the reference signal to a constant voltage level, and otherwise, modifying, by the power conversion circuit, the voltage level of the reference signal using the value of the load current. Method 600 further includes comparing, by control circuit 110, received values of load current 140 to threshold value 114. If the comparison indicates that load current 140 is less than threshold value 114, then reference voltage level 116 is set to a particular voltage level that does not change in response to changes in load current 140.

Otherwise, if the comparison indicates that load current 140 is greater than threshold value 114, then control circuit 110 sets reference voltage level 116 to a given voltage level based on the most recently received value of load current 140. For example, as load current 140 increases, reference voltage level 116 may decrease.

In some embodiments, control circuit 110 determines a value for a leakage current of load circuit 150. For example, the method may include using, by control circuit 110, a base leakage value for load circuit 150 and then adjusting this base value based on a current operating temperature of load circuit 150. In some embodiments, the base leakage value is adjusted using fabrication process information associated with load circuit 150. Threshold value 114 is then set using the determined value for the leakage current. The method ends in block 690. In some embodiments, method 600 repeats while power conversion circuit 101 is enabled.

It is noted that method 600 is an example used to demonstrate disclosed concepts. Variations of the disclosed method are contemplated. For example, although the operations are shown as occurring in a serial fashion, some or all of the disclosed operations may be performed in parallel. The generating of block 710 as well as the monitoring of block 620 may be performed continuously while the operations of block 630 are performed.

Figure 7:
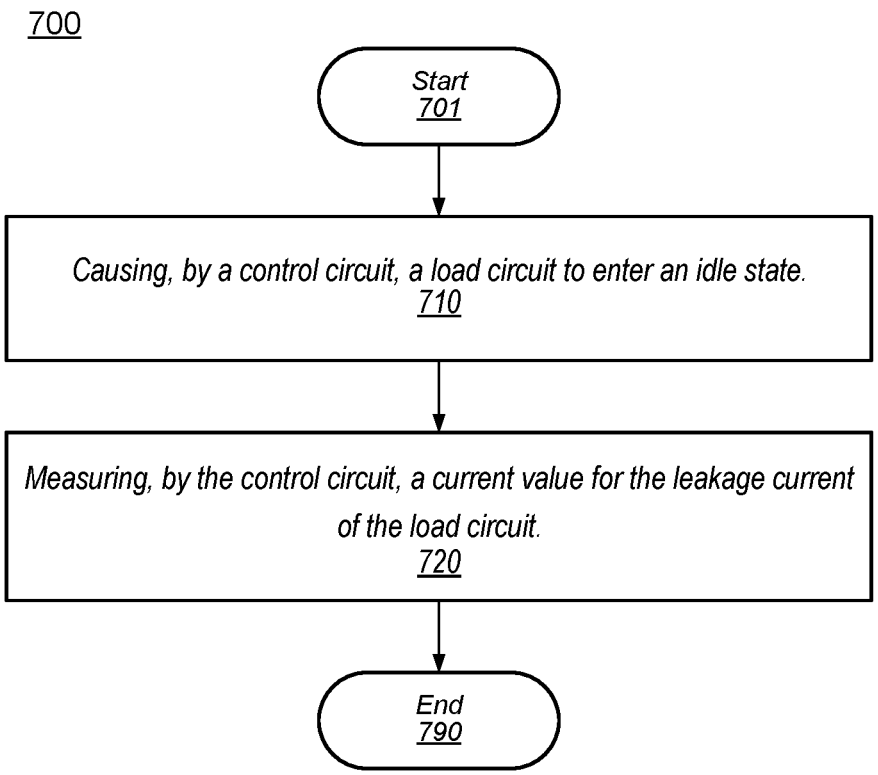
FIG. 7 illustrates a flow diagram of an embodiment of a method for determining a leakage current of a load circuit.

Proceeding now to FIG. 7, a flow diagram of a method for determining a leakage current of a load circuit is illustrated. Method 700 may be performed by a power conversion circuit, for example, by control circuit 110 in power conversion circuit 101 in FIGS. 1 and 4. In some embodiments, method 700 may be performed prior to, and/or while performing method 600 in FIG. 6. Referring collectively to FIGS. 4, and 7, method 700 begins in block 701.

At block 710, method 700 includes determining, by a power conversion circuit, a leakage current of a load circuit by causing the load circuit to enter an idle state. To determine a value of the leakage current of load circuit 150, operating logic circuit 424 sends to load circuit 150 via communication link 450, a request to enter an idle state. In some embodiments, the idle state may correspond to a particular reduced power mode in which sub-circuits within load circuit 150 may be placed into a particular state for reducing current consumption of load circuit 150. In other embodiments, the idle state may cause load circuit 150 to cease generation of internal clock signals and/or block propagation of clock signals. In the idle state, load circuit 150 may consume only a leakage current caused by current leaking through disabled transistors from regulated power supply node 130 to a ground reference node.

Method 700 further includes, at block 720, measuring, by the power conversion circuit, a current value for the leakage current. After load circuit 150 enters the idle state, control circuit 110 measures a value of load current 140. While load circuit 150 is in the idle state, the measured value of load current 140 may equal or be indicative of an amount of leakage current consumed by load circuit 150. To measure load current 140, control circuit 110 may, for example, utilize current sensor 403. Once load current 140 has been measured, operating logic circuit 424 may send a signal to load circuit 150 to indicate that the leakage current measurement has been completed and load circuit 150 may return to a previous operating mode. Operating logic circuit 424 may set a value for threshold value 114 based on the measured value of the leakage current. The method ends in block 790.

It is noted that method 700 of FIG. 7 is merely an example. Variations of the disclosed methods are contemplated. For example, an additional step may be included after block 720 to cause the load circuit to exit the idle state.

Figure 8:
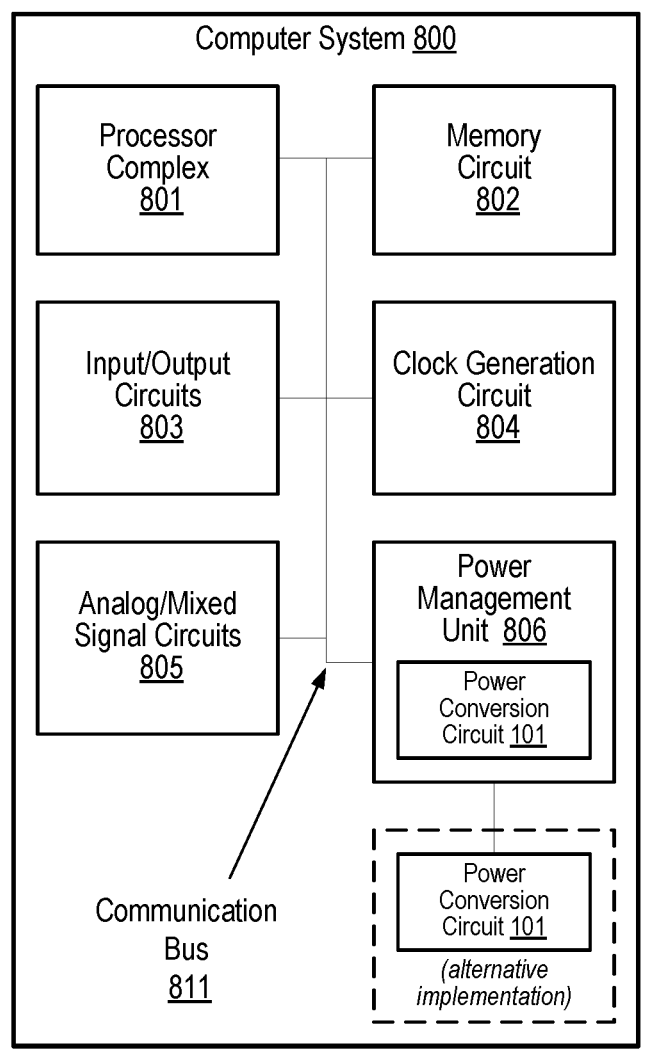
FIG. 8 depicts a block diagram of an embodiment of a computer system that includes a system.

FIGS. 1-7 illustrate apparatus and methods for implementing a power conversion circuit in a system. Power conversion circuits, such as those described above, may be used in a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 800 that includes the disclosed circuits is illustrated in FIG. 8. Computer system 800 may, in some embodiments, correspond to system 100 in FIG. 1. As shown, computer system 800 includes processor complex 801, memory circuit 802, input/output circuits 803, clock generation circuit 804, analog/mixed-signal circuits 805, and power management unit 806. These functional circuits are coupled to each other by communication bus 811. As shown, an embodiment of power conversion circuit 101 may be included within power management unit 806 or may be implemented as a separate element providing a power signal to power management unit 806.

Processor complex 801, in various embodiments, may be representative of a general-purpose processor that performs computational operations. For example, processor complex 801 may be a central processing unit (CPU) such as a microprocessor, a microcontroller, an application-specific integrated circuit (ASIC), or a field-programmable gate array (FPGA). In some embodiments, processor complex 801 may correspond to a special purpose processing core, such as a graphics processor, audio processor, or neural processor, while in other embodiments, processor complex 801 may correspond to a general-purpose processor configured and/or programmed to perform one such function. Processor complex 801, in some embodiments, may include a plurality of general and/or special purpose processor cores as well as supporting circuits for managing, e.g., power signals, clock signals, and memory requests. In addition, processor complex 801 may include one or more levels of cache memory to fulfill memory requests issued by included processor cores.

Memory circuit 802, in the illustrated embodiment, includes one or more memory circuits for storing instructions and data to be utilized within computer system 800 by processor complex 801. In various embodiments, memory circuit 802 may include any suitable type of memory such as a dynamic random-access memory (DRAM), a static random access memory (SRAM), a read-only memory (ROM), electrically erasable programmable read-only memory (EEPROM), or a non-volatile memory, for example. It is noted that in the embodiment of computer system 800, a single memory circuit is depicted. In other embodiments, any suitable number of memory circuits may be employed. In some embodiments, memory circuit 802 may include a memory controller circuit as well communication circuits for accessing memory circuits external to computer system 800.

Input/output circuits 803 may be configured to coordinate data transfer between computer system 800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 803 may be configured to implement a version of Universal Serial Bus (USB) protocol or IEEE 1394 (Firewire®) protocol.

Input/output circuits 803 may also be configured to coordinate data transfer between computer system 800 and one or more devices (e.g., other computing systems or integrated circuits) coupled to computer system 800 via a network. In one embodiment, input/output circuits 803 may be configured to perform the data processing necessary to implement an Ethernet (IEEE 802.3) networking standard such as Gigabit Ethernet or 10-Gigabit Ethernet, for example, although it is contemplated that any suitable networking standard may be implemented.

Clock generation circuit 804 may be configured to enable, configure and manage outputs of one or more clock sources. In various embodiments, the clock sources may be located in analog/mixed-signal circuits 805, within clock generation circuit 804, in other blocks with computer system 800, or come from a source external to computer system 800, coupled through one or more I/O pins. In some embodiments, clock generation circuit 804 may be capable of enabling and disabling (e.g., gating) a selected clock source before it is distributed throughout computer system 800. Clock generation circuit 804 may include registers for selecting an output frequency of a phase-locked loop (PLL), delay-locked loop (DLL), frequency-locked loop (FLL), or other type of circuits capable of adjusting a frequency, duty cycle, or other properties of a clock or timing signal.

Analog/mixed-signal circuits 805 may include a variety of circuits including, for example, a crystal oscillator, PLL or FLL, and a digital-to-analog converter (DAC) (all not shown) configured to generated signals used by computer system 800. In some embodiments, analog/mixed-signal circuits 805 may also include radio frequency (RF) circuits that may be configured for operation with cellular telephone networks. Analog/mixed-signal circuits 805 may include one or more circuits capable of generating a reference voltage at a particular voltage level, such as a voltage regulator or band-gap voltage reference.

Power management unit 806 may be configured to generate a regulated voltage level on a power supply signal for processor complex 801, input/output circuits 803, memory circuit 802, and other circuits in computer system 800. In various embodiments, power management unit 806 may include one or more voltage regulator circuits, including, e.g., one or more embodiments of power conversion circuit 101. In some embodiments any suitable number of regulated voltage levels may be generated. Additionally, power management unit 806 may include various circuits for managing distribution of one or more power signals to the various circuits in computer system 800, including maintaining and adjusting voltage levels of these power signals. Power management unit 806 may include circuits for monitoring power usage by computer system 800, including determining or estimating power usage by particular circuits. In some embodiments, power management unit 806 receives a regulated power signal from an embodiment of power conversion circuit 101 that is external to power management unit 806. In such embodiments, power management unit 806 may be configured to distribute the regulated power signal to the other circuits included in computer system 800.

It is noted that the embodiment illustrated in FIG. 8 includes one example of a computer system. A limited number of circuit blocks are illustrated for simplicity. In other embodiments, any suitable number and combination of circuit blocks may be included. For example, in other embodiments, security and/or cryptographic circuit blocks may be included.

Figure 9:
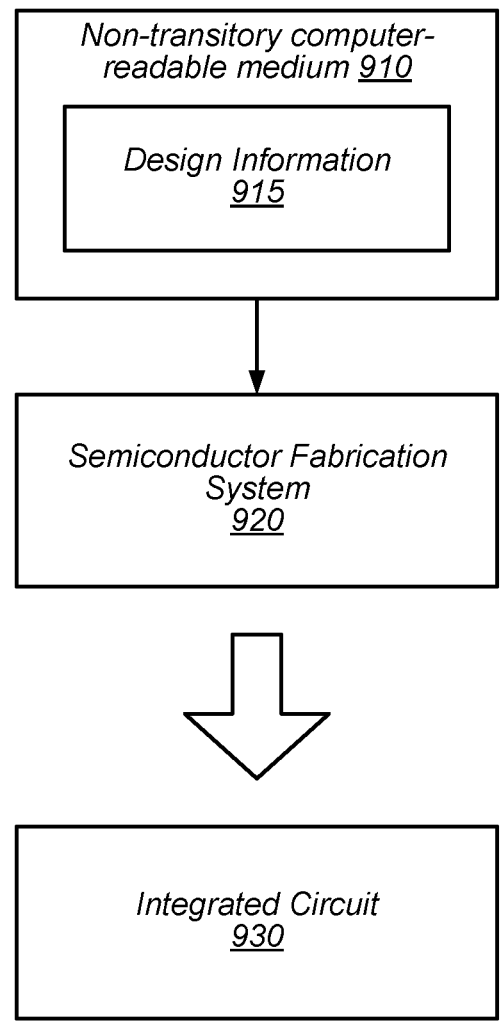
FIG. 9 illustrates a block diagram depicting an example computer-readable medium, according to some embodiments.

FIG. 9 is a block diagram illustrating an example of a non-transitory computer-readable storage medium that stores circuit design information, according to some embodiments. The embodiment of FIG. 9 may be utilized in a process to design and manufacture integrated circuits, such as, for example, an IC that includes computer system 800 of FIG. 8. In the illustrated embodiment, semiconductor fabrication system 920 is configured to process the design information 915 stored on non-transitory computer-readable storage medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor level netlists, mask design data, characterization data, and the like, of cells included in the cell library.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a first phase circuit coupled to a regulated power supply node and configured, in response to being enabled, to generate a first power signal on the regulated power supply node using a reference voltage level;
a second phase circuit coupled to the regulated power supply node and configured, in response to being enabled, to generate a second power signal on the regulated power supply node using the reference voltage level; and
a control circuit configured to:
monitor a load current from the regulated power supply node;
in response to sensing a first amount of load current that is lower than a threshold amount of current:
generate the reference voltage level independent of the first amount of load current; and
enable the first phase circuit and disable the second phase circuit.

2. The apparatus of claim 1, wherein the control circuit is further configured, in response to sensing a second amount of load current that is higher than the threshold amount of current:
generate the reference voltage level based on the second amount of load current; and
enable the second phase circuit and disable the first phase circuit.

3. The apparatus of claim 2, wherein the control circuit is further configured to reduce the reference voltage level in response to an increase in the load current.

4. The apparatus of claim 1, wherein the control circuit is further configured to determine the threshold amount of current using a determined value of an idle state current of a load circuit coupled to the regulated power supply node.

5. The apparatus of claim 4, wherein the control circuit is further configured to determine the idle state current of the load circuit using temperature information received from a temperature sensor.

6. The apparatus of claim 4, wherein the control circuit is further configured to determine the idle state current of the load circuit using fabrication process information received from the load circuit.

7. The apparatus of claim 1, wherein a voltage level of the first power signal is greater than a voltage level of the second power signal when an amount of the load current is equal to the threshold amount of current.

8. The apparatus of claim 1, wherein the first phase circuit, when generating the first power signal, is configured to consume less power than the second phase circuit when generating the second power signal.

9. A method comprising:
  generating, by a control circuit, a reference voltage level independent of a monitored load current;
  enabling, by the control circuit, a first phase circuit to generate a first power signal on a regulated power supply node using the reference voltage level;
  in response to determining that the monitored load current satisfies a threshold current, generating, by the control circuit, the reference voltage level based on the monitored load current; and
  disabling, by the control circuit, the first phase circuit and enabling a second phase circuit to generate a second power signal on the regulated power supply node using the reference voltage level.

10. The method of claim 9, further comprising determining, by the control circuit, the monitored load current using a current sensor to sense an amount of current from the regulated power supply node to a load circuit coupled to the regulated power supply node.

11. The method of claim 10, further comprising determining, by the control circuit, the threshold current using a determined value of an idle state current of the load circuit.

12. The method of claim 11, further comprising determining the idle state current by:
  accessing a stored base value of the idle state current for the load circuit; and
  determining a current value of the idle state current using the stored base value and one or more measurements.

13. The method of claim 11, further comprising determining the idle state current of the load circuit by:
  causing the load circuit to enter an idle state; and
  using the current sensor to measure a value for the idle state current.

14. The method of claim 9, wherein generating the reference voltage level based on the monitored load current includes reducing the reference voltage level in response to an increase in the monitored load current.

15. A system, comprising:
  a voltage regulator circuit coupled to a regulated power supply node and configured to generate a power signal on the regulated power supply node using a reference voltage level;
  a load circuit coupled to the regulated power supply node; and
  a control circuit configured to:
    set a threshold value using a determined value of a leakage current for the load circuit;
    determine an operating mode using results of a comparison of the threshold value and a sensed load current being drawn from the regulated power supply node by the load circuit;
    set, in a first operating mode, the reference voltage level independently of the sensed load current; and
    set, in a second operating mode, the reference voltage level using the sensed load current.

16. The system of claim 15, wherein to generate the determined value of the leakage current, the control circuit is configured to:
  cause the load circuit to enter an idle state; and
  measure the determined value of the leakage current.

17. The system of claim 15, wherein to generate the determined value of the leakage current, the control circuit is further configured to:
  access a stored base value of the leakage current for the load circuit;
  retrieve an operating temperature value from a temperature sensor; and
  generate the determined value of the leakage current using the stored base value and the operating temperature value.

18. The system of claim 17, further comprising a communication link between the control circuit and the load circuit; and
  wherein the control circuit is further configured to access the stored based value of the leakage current from the load circuit using the communication link.

19. The system of claim 15, wherein to set the reference voltage level independently of the sensed load current, the control circuit is configured to couple the voltage regulator circuit to a constant reference voltage signal.

20. The system of claim 19, further comprising a bandgap voltage reference circuit configured to generate the constant reference voltage signal.

* * * * *